United States Patent [19]

Ueda

[11] Patent Number: 5,369,435
[45] Date of Patent: Nov. 29, 1994

[54] CONTRAST DETECTING APPARATUS FOR CONTROLLING AN AUTOMATIC FOCUSING OPERATION OF AN IMAGING APPARATUS

[75] Inventor: Shinobu Ueda, Nagaokakyo, Japan

[73] Assignee: Mitsubishi Denki Kabushiki Kaisha, Kyoto, Japan

[21] Appl. No.: 603,324

[22] Filed: Oct. 25, 1990

[30] Foreign Application Priority Data

Oct. 27, 1989 [JP] Japan .................. 1-281266
Mar. 6, 1990 [JP] Japan .................. 2-55604

[51] Int. Cl.⁵ ............................... H04N 5/232
[52] U.S. Cl. ...................... 348/353; 354/400
[58] Field of Search ............ 358/227, 228, 209; 354/400, 402; 250/201.2, 201.8, 201.7; H04N 5/232

[56] References Cited

U.S. PATENT DOCUMENTS

| | | | |
|---|---|---|---|
| 4,542,289 | 9/1985 | Yokoyama et al. | 250/201 |
| 4,804,831 | 2/1989 | Baba et al. | 250/201 |
| 4,872,058 | 10/1989 | Baba et al. | 358/227 |
| 4,882,601 | 11/1989 | Taniguchi et al. | 354/407 |
| 4,903,134 | 2/1990 | Murashima et al. | 358/227 |
| 4,967,279 | 10/1990 | Murashima | 358/227 |
| 4,967,280 | 10/1990 | Takuma et al. | 358/227 |

FOREIGN PATENT DOCUMENTS

2-1286  1/1990  Japan ............... G02B 7/28

OTHER PUBLICATIONS

"T.V. Camera Automatic Focal Point Adjustment by Hill–Climbing Servo Mechanism", vol. 17, No. 1, pp. 26, 1965, in NHK Technical Report.

*Primary Examiner*—Joseph Mancuso
*Assistant Examiner*—Tuan V. Ho

[57] ABSTRACT

A contrast detecting apparatus includes first extracting means for extracting a signal component of a first frequency band from a luminance signal obtained by imaging a subject, second extracting means for extracting a signal component of a second frequency band lower than the first frequency band from the luminance signal obtained by imaging the subject, and determining means for determining a state of contrast of the subject in accordance with extracted outputs of the first and second extracting means. Therefore, when the contrast detecting apparatus is used, it can be exactly and automatically determined whether the contrast of the subject exists or not in accordance with a luminance signal obtained from the subject. In addition, when the contrast detecting apparatus is applied to the automatic focusing apparatus, it is possible to control the drive of lens or information supplying means to users in accordance with whether the contrast of the subject exists or not, and as a result when the subject having no contrast is imaged, the lens is stopped to be driven so that function and operability of the automatic focusing apparatus can be improved.

13 Claims, 10 Drawing Sheets

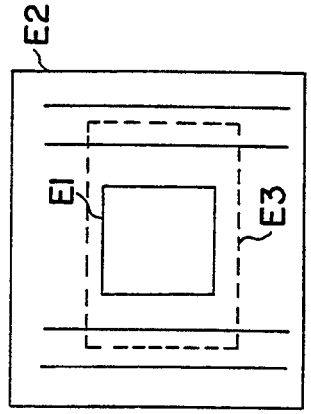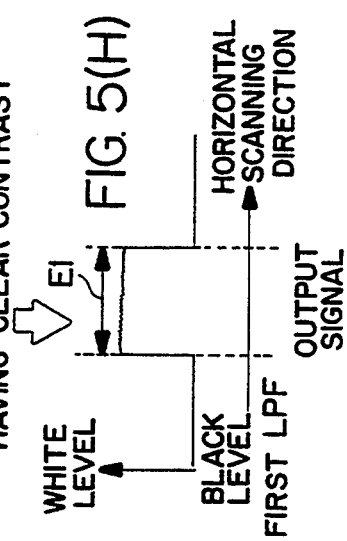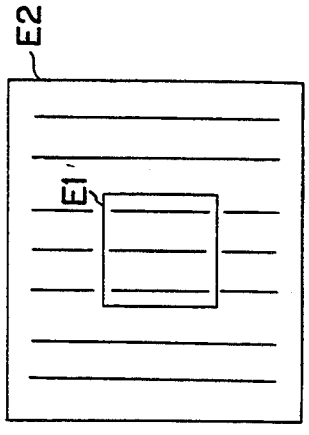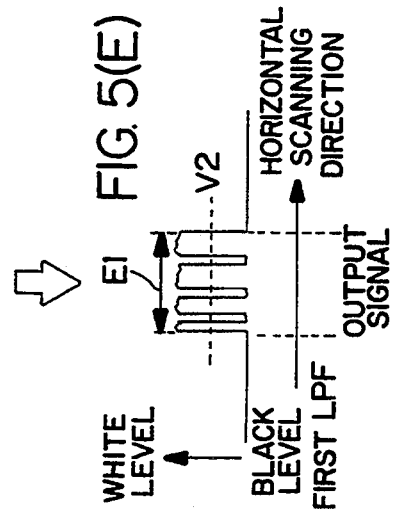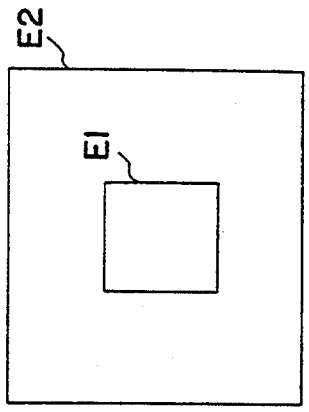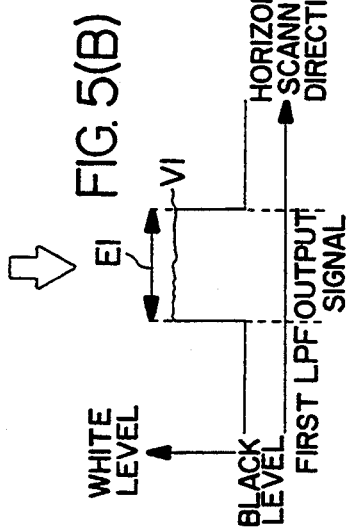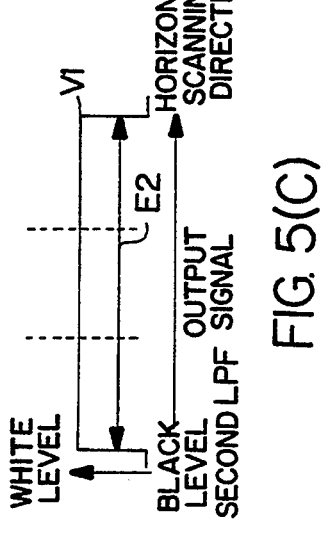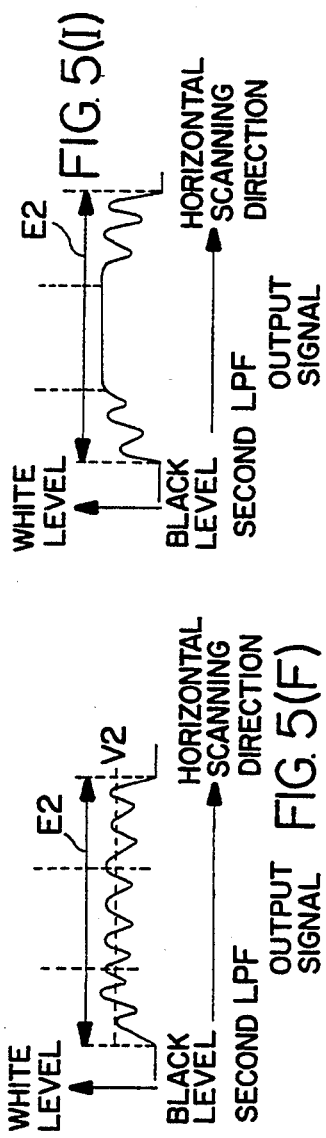

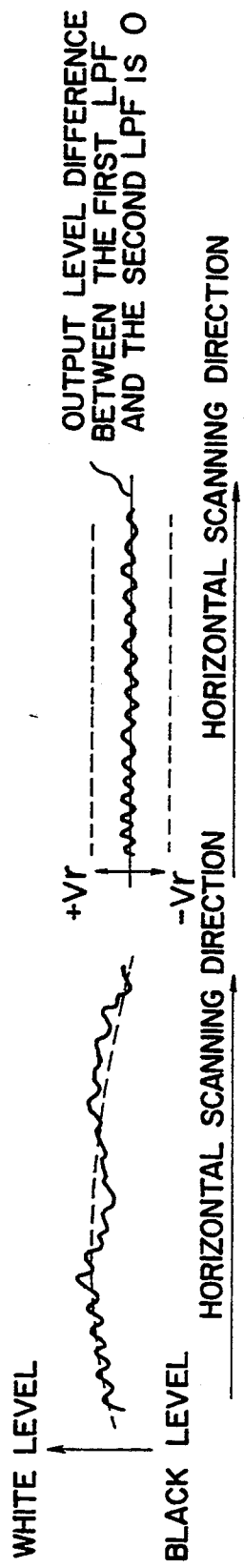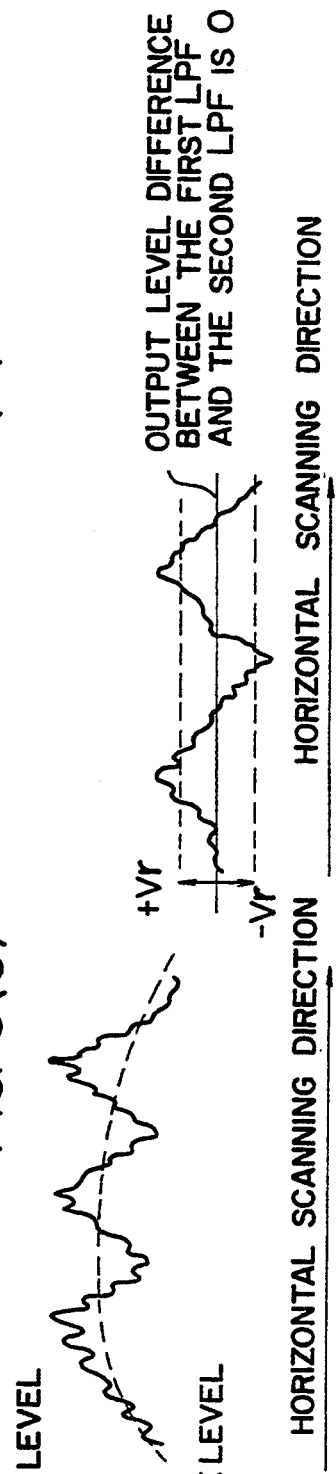

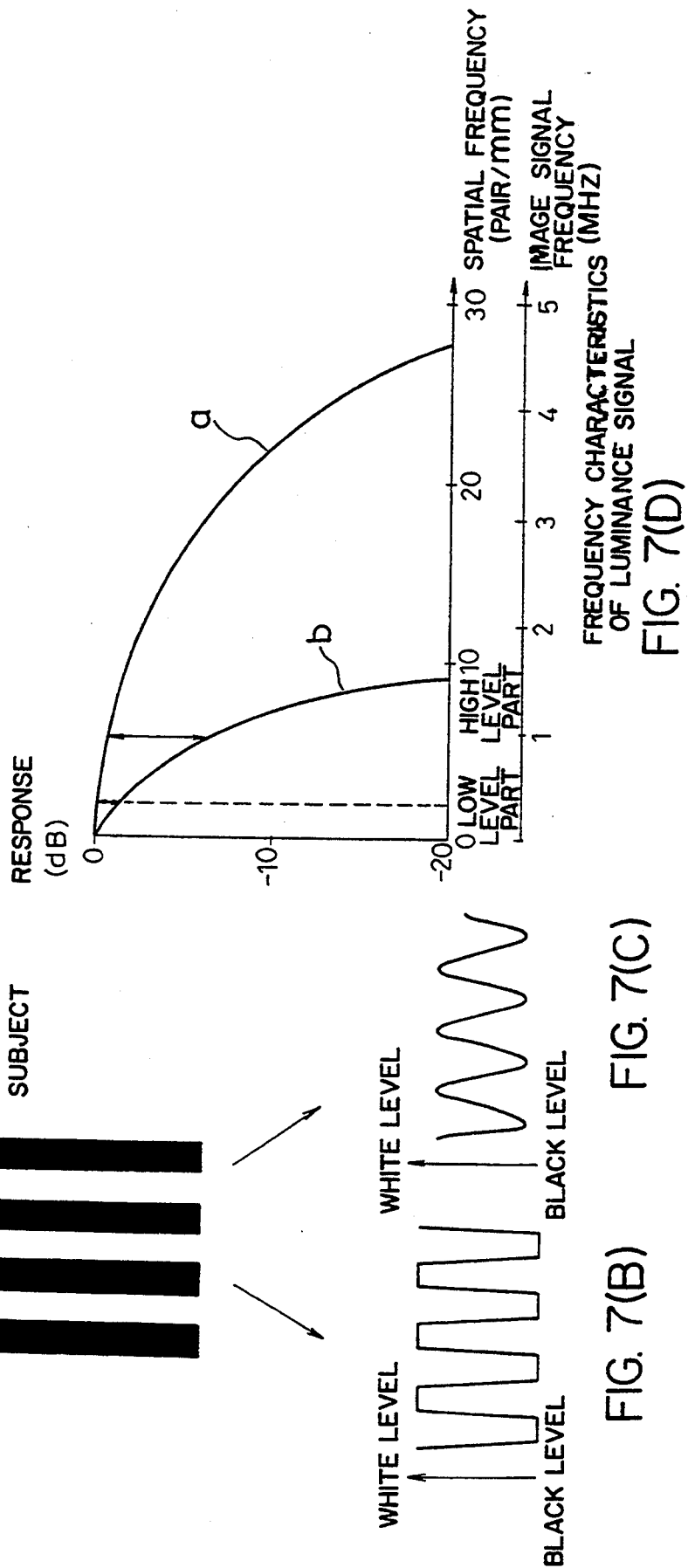

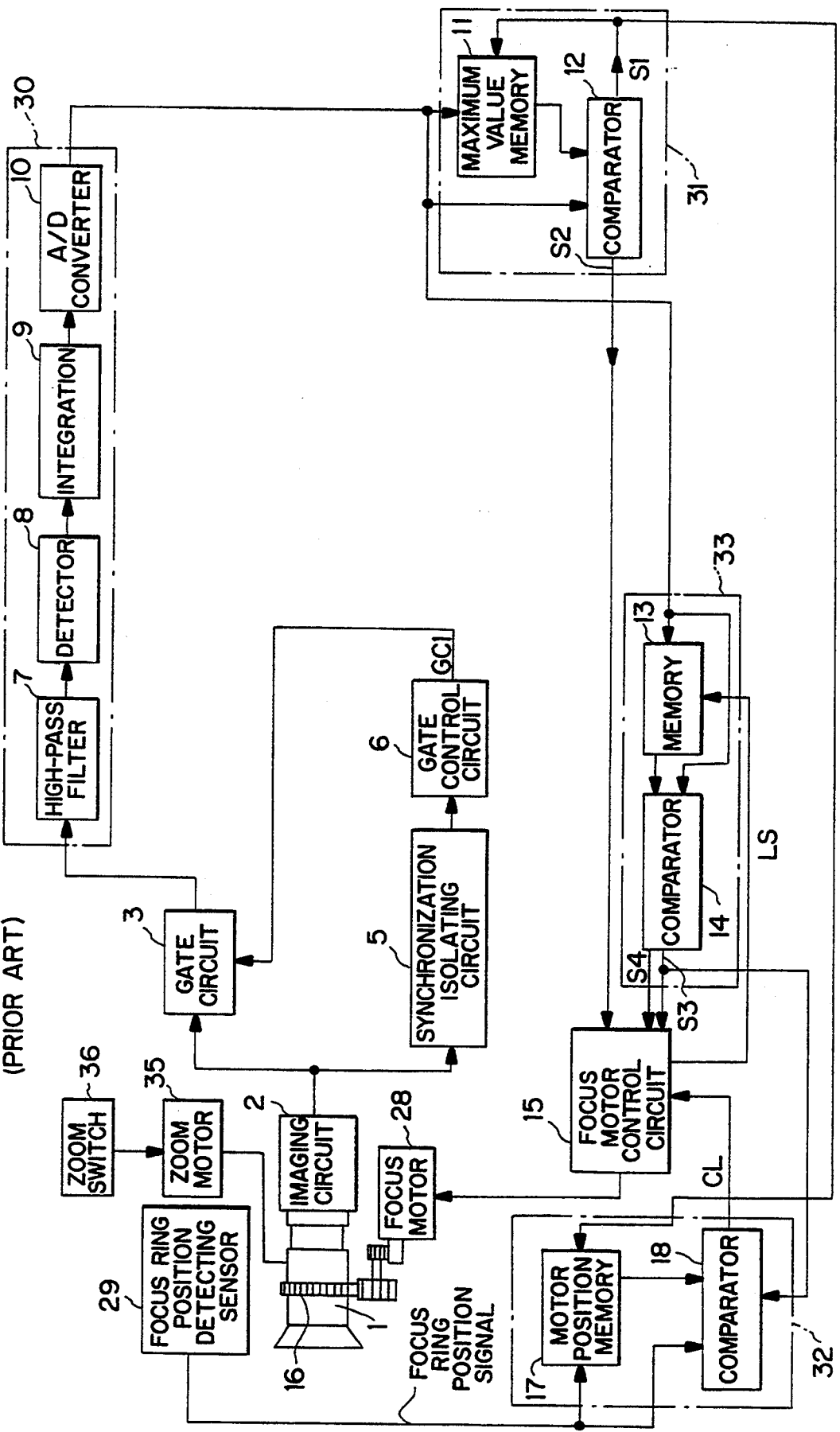

CONTRAST DETECTING APPARATUS FOR CONTROLLING AN AUTOMATIC FOCUSING OPERATION OF AN IMAGING APPARATUS

FIELD OF THE INVENTION

The present invention relates to a contrast detecting apparatus which detects a state of contrast of a subject in accordance with a video signal obtained by imaging the subject and, more particularly, to a contrast detecting apparatus for controlling automatic focusing operation of an imaging apparatus.

DESCRIPTION OF THE BACKGROUND ART

An imaging apparatus such as video camera comprises an automatic focusing apparatus for automatically focusing on a subject. Some of the above automatic focusing apparatuses focus on the subject by using a signal obtained from an imaging device. Such automatic focusing method using the video signal has many advantages, for example correct focusing is performed in spite of a depth of field or the like or its structure is very simple because a sensor especially for automatic focusing is not necessary. A hill-climbing servo mechanism which is an example of that automatic focusing method is described in "T.V. Camera Automatic Focal Point Adjustment by Hill-climbing Servo Mechanism", Vol. 17, No. 1 (Whole Number 86), pp.26, 1965, in NHK Technical Report.

FIG. 8 is a schematic block diagram showing a conventional automatic focusing apparatus using the hill-climbing servo mechanism, which is comprised in a video camera.

Referring to FIG. 8, a camera part 1 comprises a focus lens which is moved by operation of the automatic focusing apparatus, a zoom lens for changing an imaging angle and other series of lenses. The focus lens and the zoom lens move in the right and left directions in the FIG. 8 embodiment in accordance with rotary movement of a focus ring 16 provided at an outer periphery of the camera part I. The focus ring 16 is driven to rotate by a focus motor 28. An imaging circuit 2 is provided behind the camera part 1. The imaging circuit 2 comprises an imaging device.

When the subject is imaged, the subject focuses into an image on the imaging device in the imaging circuit 1 by the series of lenses comprising the focus lens in the camera part 1. This image of the subject is converted to a video signal comprising a luminance signal having horizontal/vertical synchronizing signal by the imaging circuit 2 comprising the imaging device. This luminance signal is input to a gate circuit 3 and a synchronization isolating circuit 5. The synchronization isolating circuit 5 isolates vertical and horizontal synchronizing signals from the luminance signals. The isolated horizontal/vertical synchronizing signals are input to a gate control circuit 6 for setting a relatively small prescribed region in the image screen as a luminance signal extracting region (sampling area) for focusing operation.

The gate control circuit 6 comprises a fixed oscillator oscillating with a constant frequency and applies a gate switching signal GC1 which passes only the luminance signal obtained from the above prescribed region to the gate circuit 3 so that the prescribed region may be set as the sampling area in accordance with the vertical synchronizing signal, the horizontal synchronizing signal and an output of the fixed oscillator.

Therefore, the luminance signal corresponding to the sampling area set by the gate control circuit 6 is only applied to an HPF (high-pass filter) 7 provided behind the gate circuit 3. Therefore, a high frequency component is extracted from the luminance signal corresponding to the sampling area which passed through the gate circuit 3 by the HPF 7. Then, amplitude detection of the extracted high frequency component is performed by a detector 8 at next stage. The output from the detector 8, that is, the level of the high frequency component is integrated by an integration circuit every field and applied to an A/D converter 10. The A/D converter 10 converts the output of the integration circuit 9 to a digital value. The digital value is applied to a maximum value memory 11, comparators 12 and 14 and a memory 13 as a value indicating a focused state of the optical system against the subject (a focal point evaluating value).

FIG. 9 is a view showing the relation between the thus obtained focal point evaluating value and a position of the focus lens. In FIG. 9, the abscissa shows a position of the focus ring 16 which indirectly indicates the position of the focus lens and the ordinate shows the focal point evaluating value. For example, in a case where the subject is at a distance of 2m from the camera part 1, the focal point evaluating value indicates the maximum value when the focus lens moved by the focus ring 16 is focused on the subject at a distance of 2m from the camera part 1 as shown in FIG. 9. More specifically, the focal point evaluating value varies while forming a conical shape with the position of the focus lens focused on the subject as its center.

The maximum value memory 11 stores the focal point evaluating value applied from the A/D converter 10 in the first place as the maximum evaluating value until a comparison signal S1 to be described later is applied from the comparator 12 and also inputs the maximum evaluating value to the comparator 12 in response to an input of the focal point evaluating value from the A/D converter 10.

The comparator 12 compares the value applied from the maximum value memory 11, that is, the previous maximum focal point evaluating value with the present focal point evaluating value applied from the A/D comparator 10. Then, the comparator 12 outputs a comparison signal S1 when the present focal point evaluating value is bigger than the value stored in the maximum value memory 11 (first mode) and outputs a comparison signal $2 when the present focal point evaluating value is smaller than the value stored in the maximum memory 11 by a predetermined second threshold value or more (second mode). The comparison signal S1 is applied to the maximum value memory 11 and a motor position memory 17 and the comparison signal $2 is applied to the focus motor control circuit 15.

As described above, the focal point evaluating value is the maximum when the focus lens is focused. Therefore, as the focus lens approaches the focused position from a nonfocused position, the focal point evaluating value is increased. Therefore, the first mode shows the state ,where the focus lens moves toward the focused position and the second mode shows the state where the focus lens passed through the focused position and goes away from the focused position.

The maximum memory 11 restores the newest focal point evaluating value applied from the maximum focal point evaluating value A/D converter 10 in response to the output S1 of the comparator 12, that is, in the first mode in which the focus lens has not yet reached the focused position. Therefore, the maximum value of the focal point evaluating values up to the present is stored as the maximum value evaluating value in the maximum value memory 11.

On the other hand, the focus motor control circuit 15 drives the focus motor 28 so as to move the focus lens backward or forward at the same time when the camera starts to image the subject. Then, the focus motor control circuit 15 reverses the rotating direction of the focus motor 28 in the second mode in which the focus lens passed through the focused position in response to the comparison signal S2 output from the comparators 12 and also in a third mode in which the moving direction of the focus lens is not appropriate (gone away from the focused position) in the initial stage in response to a control signal S3 from a comparator 14 to be described later. Thus, the focus lens changes its moving direction from a direction in which it approaches the imaging device to a direction in which it goes away from it or other way around, with the result that the focus lens starts to move toward the focused position again.

Referring to FIG. 9, for example, in a case where the subject which is at a distance of 2m from the camera part 1 is imaged, when the focus lens starts to move from a position P which is at a distance of 10m from the camera part 1 and is focused on the subject in a direction (a) in which the focus lens approaches the focused position, the focal point evaluating value starts to monotonously increase until the focus lens reaches the focused position Q. Therefore, the comparison signal S1 is output from the comparator 12 and then the contents of the maximum value memory 11 and the motor position memory 17 are continuously renewed until the focus lens reaches the focused position. At this time, the focus motor is controlled by the focus motor control circuit 15 to successively move the focus ring 16 so that the focus lens approaches the focused position. Thus, the focus lens reaches the focused position and passes through this. In this case, if a first threshold value is a reverse reference value with a width shown by A in FIG. 9, when the focus ring 16 reaches a position R1 shown in FIG. 9 after the focus lens passed through the focused position, the comparison signal S2 indicating the second mode is output from the comparator 12. In response to this the focus motor 28 is controlled by the focus motor control circuit 15 and then moves the focus ring 16 in the reverse direction, whereby the focus lens starts to move toward the focused position again.

Meanwhile, the motor position memory 17 is provided to store a focus lens position X which is the nearest to the focused position until the present time. The motor position memory 17 receives an output from a focus ring position detecting sensor 29 connected to the focus ring 16. The focus ring position detecting sensor 29 detects the position of the focus ring 16 to indirectly detect the position of the focus lens and then outputs a focus lens position signal indicating the position of the focus lens. Then, the motor position memory 17 renews its contents, that is, the focus lens position X so that the present focus lens position signal from the focus lens position detecting circuit 29 is stored therein in response to the comparison signal S1 output from the comparator 12. More specifically, in the first mode the contents of the motor position memory 17 always corresponds to the present focus lens position.

However, in the second mode, since the comparison signal S1 is not applied to the motor position memory 17, the motor position memory 17 continues to hold the contents stored when the first mode is changed to the second mode, that is, holds the focus ring position signal indicating the focus lens position (focused position) in which the focal point evaluating value is the maximum. More specifically, the focus lens position corresponding to the focal evaluating value which is stored in the maximum value memory 11 as the maximum evaluating value is always stored in the motor position memory 17.

Meanwhile, a comparator 18 compares the contents of the motor position memory 17 with the focus ring position signal from the focus ring position detecting sensor 29 and when they coincide with each other, it outputs a prescribed control signal CL to the focus motor control circuit 15. The focus motor control circuit 15 stops the focus motor 28 in response to this control signal CL. Accordingly, the movement of the focus ring 16, that is, the movement of focus lens is stopped. At this time, the contents of the motor position memory 17 in the second mode is the signal indicating the focus ring position in which the focal point evaluating value is the maximum. Therefore, in the second mode, the focus motor 28 starts to rotate in the reverse direction in response to the output signal S2 from the comparator 12 and when the focus lens reaches the focused position again, the comparator 18 operates as described above and then the focus motor stops and the focus lens stops at the focused position.

Thus, basic automatic focusing operation of this apparatus in which the prescribed region in the imaging screen is set as a focus detecting region is completed. As can be seen from the above, a focal point evaluating value forming part 30 for finding the focal point evaluating value in the focus detecting region comprises the HPF 7, the detector 8, the integration circuit 9 and the A/D converter 10, a focal point evaluating value change detecting part 31 for detecting a change of the focal point evaluating value in accordance with movement of the focus lens comprises the maximum value memory 11 and the comparator 12, and a focused position detecting part 32 for detecting that the focus lens reaches a wrong focused position after the focus motor 28 rotates in the reverse direction comprises the motor position memory 17 and the comparator 18. In addition, a cut-off frequency of the HPF 7 is generally selected from 200 kHz to 800 kHz or more.

Meanwhile, the focus motor control circuit 15 stops the focus motor 28 and outputs a lens stopping signal LS to the memory 13 at the same time in response to the control signal CL from the comparator 18.

The memory 13 keeps the focal point evaluating value input from the A/D converter 10 in response to the lens stopping signal LS output when the automatic focusing operation is completed, that is, the focal point evaluating value when the subject is in focus until the next lens stopping signal is applied and then outputs it to the comparator 14 of the next stage. Thus, the present focal point evaluating value is applied from the A/D converter 10 to the comparator 14. After the automatic focusing operation is completed, the comparator 14 compares the output of the memory 13, that is, the focal point evaluating value when the subject is in focus with the present focal point evaluating value. Then, when the difference between the present focal point evaluating value and the contents of the memory 13 is a prescribed second threshold value or less, the comparator 14 outputs a subject change signal S4 indicating that the subject is changed to the focus motor control circuit 15. The focus motor control circuit 15 drives the focus motor 28 in either direction and starts the above series of focusing operation again in response to the subject change signal S4. As a result, the automatic focusing operation is performed following the change of the subject. Thus, a subject change detecting part 33 for detecting the change of the subject comprises the memory 13 and the comparator 14.

At the same time, the subject change detecting part 33 has the function of determining whether the rotating direction of the focus motor 28 is appropriate or not just after the automatic focusing operation starts, and correcting it to the right direction. More specifically, the memory 13 stores not only the focal point evaluating value when the automatic focusing operation is completed but also the focal point evaluating value applied from the A/D converter 10 when the automatic focusing operation starts. Then, the comparator 14 outputs the control signal S3 to the focus motor control circuit 15 when the focal point evaluating value applied from the A/D converter 10 just after the automatic focusing operation starts is less than the focal point evaluating value (referred to as an initial value hereinafter) stored in the memory 13 when the automatic focusing operation starts (when the present lens moving direction is not directed to the focused position). The focus motor control circuit 15 reverses the focus motor 28 in response to the control signal S3 from the comparator 14. At the same time, the control signal S3 is input to the comparator 18 and inactivates comparison operation of the comparator 14. The comparator 14 continuously outputs the control signal S3 until the present focal point evaluating value becomes more than the initial value stored in the memory 13. As a result, the control signal CL is not output from the comparator 18 until the present focal point evaluating value becomes more than the focal point evaluating value when the automatic focusing operation starts and the focus motor 28 continuously moves in the direction opposite to the first driving direction. Therefore, even if the moving direction of the focus lens when the automatic focusing operation starts is not appropriate, the focus lens is surely moved in a direction in which the focal point evaluating value becomes the maximum.

Referring to FIG. 9, for example, when the subject at a distance of 2m from the camera part 1 is imaged, if the focus lens starts to move from a position P which is at a distance of 10m from the camera part 1 and is focused on the subject in a direction in which it goes away from the focused position (shown by (b) in FIG. 9), the focal point evaluating value is decreased as the focus ring 16 moves. At this time, if a second threshold value is a reverse reference value with a width shown by B in FIG. 9, when the focus ring 16 reaches a position R2 in FIG. 9 after the automatic focusing operation starts, the control signal S3 is output from the comparator 14. Accordingly, the focus motor 28 starts to move the focus ring 16 in the reverse direction. Then, since the operation of the comparator 14 is not activated until the focus ring 16 passes through the position P in FIG. 9, the focus ring 16 returns the focus lens to the position when the automatic focusing operation starts and then continuously moves it toward the focused position. Thereafter, when the focus ring 16 moves slightly beyond a focused position Q, it returns to the focused position and then stops there by the above operation of the motor position memory 17 and the comparator 18 or the like.

As described above, the focal point evaluating value forming part 30, the focal point evaluating value change detecting part 31, the focused position detecting part 32 and the subject change detecting part 33 control the focus motor control circuit 15, whereby the automatic focusing operation utilizing hill-climbing servo mechanism is performed.

In addition, not the whole screen but the prescribed region at the center of the screen is generally the object of focusing (this region is referred to as an on-focus detecting region) in order to focus into the image projected in the center of the screen.

FIG. 10 is a view showing a structure of an automatic focusing apparatus shown in which a zoom motor 35 and a zoom switch 36 for changing an imaging angle are further provided in the automatic focusing apparatus shown in FIG. 8.

The zoom lens is driven by the zoom motor 35 and moves in the camera part 1 in parallel with an optical axis. Thus, a focal distance of the lens system in the camera part 1 varies, whereby the imaging angle varies. The zoom motor 35 moves the zoom lens in response to a key input from the external switch (zoom switch) 36 which is provided so that the user can vary the imaging angle in accordance with necessity. More specifically, when the zoom switch 36 is pushed, the zoom motor 35 operates to move the zoom lens in a direction in which the imaging angle is increased (wide angle side) or in a direction in which it is decreased (telephoto side). Therefore, while the zoom switch 36 is pushed, the image taken by the imaging circuit 2 is expanding or reducing.

As described above, the conventional automatic focusing apparatus using the hill-climbing servo mechanism performs focusing operation by determining whether the subject is in focus or out of focus in accordance with an added value with an amplitude of a prescribed high frequency component comprised in a luminance signal for one field obtained by imaging the subject.

However, a frequency band of the obtained luminance signal or its level varies with brightness or contrast of the subject. Therefore, in some cases there is no frequency band to be extracted in the obtained luminance signal or the level thereof is very low even if it exists according to the condition of the subject. Thus, in some cases the prescribed high frequency component can not be obtained or the level thereof is very low even if it is obtained according to the subject. In these cases, the focal point evaluating value can not be obtained or the value is not correct even if it is obtained. Therefore, it is not possible to focus on such subject in accordance with the prescribed high frequency component in view of its principle.

Meanwhile, since the conventional automatic focusing apparatus using the hill-climbing servo mechanism has no function of determining a spectrum of a video signal of the subject at all, the above series of focusing operation is performed regardless of the difference in spectrum of the video signal of the subject. More specifically, the conventional automatic focusing apparatus performs focusing operation both on a subject in which the luminance signal comprising no prescribed high frequency component is obtained and on a subject in which the prescribed high frequency component is sufficiently obtained. Therefore, according to the conventional automatic focusing apparatus using the hill-climbing servo mechanism, when the subject in which the luminance signal comprising no prescribed high frequency component is obtained is imaged, the focus lens wastefully continues to operate while the focus lens position in which the focal point evaluating value is the maximum is not found, that is, while the image is out of focus. In addition, although the prescribed high frequency component for finding the focal point evaluating value is derived from the luminance signal obtained from a subject having clear contrast, it can hardly be derived from the luminance signal obtained from a subject having very small contrast such as a remote mountain or the sky, or a subject having no contrast such as a wall or a ceiling. Therefore, the above problems are generated when a subject having small contrast is imaged.

As described above, since the conventional automatic focusing apparatus has no function of determining the spectrum of the image signal of the subject, the existence of the contrast of the subject can not be detected, so that it does not comprise means for showing the user that the subject imaged at that time can not be in focus from the viewpoint of its principle, that is, that the subject has no contrast. Therefore, even if the above phenomenon occurred, the user can not find its cause and means for changing the subject to that having clear contrast or the like so as to prevent the focus lens from wastefully being moved. As a result, when the subject having no contrast is imaged, the image is out of focus for a long time.

In order to solve the above problems caused by unnecessary drive of the focus lens which can not bring into focus, the contrast detecting apparatus capable of detecting whether the contrast of the subject exists or not is necessary.

SUMMARY OF THE INVENTION

The present invention was made to solve the above problems and it is an object of the present invention to provide a contrast detecting apparatus which can be easily applied to an automatic focusing apparatus.

Other objects and advantages of the present invention will become apparent from the detailed description Given hereinafter; it should be understood, however, that the detailed description and specific embodiment are given by way of illustration only, since various changes and modifications within the spirit and scope of the invention will become apparent to those skilled in the art from this detailed description.

According to a contrast detecting apparatus of the present invention, the apparatus comprises first extracting means for extracting a signal component of a first frequency band from a luminance signal obtained by imaging the subject, second extracting means for extracting a signal component of a second frequency band lower than the first frequency band and determining means for determining the state of contrast of the subject in accordance with the output of the first extracting means and the output of the second extracting means.

According to another aspect of the contrast detecting apparatus of the present invention, it is used for controlling automatic focusing operation of an imaging apparatus which forces a state of an image in a first region to be in "focus" by changing the state of an optical system in accordance with a luminance signal obtained from the prescribed first region. The contrast detecting apparatus comprises first setting means for setting the first region in an imaging screen, second setting means for setting a second region in the imaging screen, first region component extracting means for extracting a signal component corresponding to the first region set by the first setting means and having a predetermined band, from the luminance signal obtained by imaging the subject, second region component extracting means for extracting a signal component corresponding to the second region set by the second setting means and having a second band lower than the predetermined band, from the luminance signal obtained by imaging the subject, first detecting means for detecting whether the contrast of the subject exists in the first region or not in accordance with the output of the first region component extracting means and the output of the second region component extracting means, and means for activating automatic focusing operation of the imaging apparatus in response to the detected output indicating "contrast exists" from the first detecting means.

According to a preferred embodiment of the present invention, the contrast detecting apparatus further comprises second detecting means for detecting whether the contrast of the subject exists or not in the second region which is set larger than the first region in response to the output indicating "no contrast exists" from the first detecting means, expanding means for expanding the first region by a prescribed area in response to the output indicating "contrast exists" from the second detecting means, expanded region component extracting means for extracting a signal component corresponding to the region expanded by the expanding means and having the prescribed band, from the luminance signal, third detecting means for detecting whether the contrast exists in a part corresponding to the expanded region of the subject or not in accordance with the output of the expanded region component extracting means and the output of the second region component extracting means, and means for prohibiting automatic focusing operation of the imaging apparatus in response to the output indicating "no contrast exists" from the third detecting means.

According to another preferred embodiment of the present invention, the contrast detecting apparatus is used in the imaging apparatus having a structure capable of changing an imaging angle and further comprises imaging angle change detecting means for detecting that the imaging angle is changing or not and means for inactivating operation of the first and second detecting means in response to the output from the imaging angle change detecting means.

According to a further preferred embodiment of the present invention, the contrast detecting apparatus is used in the imaging apparatus further comprising means for displaying whether the contrast of the subject exists or not to the outside in accordance with the detected output of the detecting means for detecting existence of the contrast.

The contrast detecting apparatus in accordance with the present invention extracts two signal components having different frequency band widths from the luminance signal obtained by imaging the subject and determines the state of the contrast of the subject in accordance with the extracted signal components. Therefore, when the video signal obtained by imaging the subject by the imaging apparatus or the like is input to the contrast detecting apparatus, it can be detected whether the contrast of the imaged subject exists or not.

In addition, according to another aspect, the contrast detecting apparatus of the present invention sets first and second regions which are focus detecting regions of the imaging apparatus in the imaging screen and makes the imaging apparatus perform the automatic focusing operation when the contrast exists in the first region. According to the preferred embodiment of the present invention, the contrast detecting apparatus sets the second region larger than the first region and resets the first region by expanding the first region when the contrast does not exist in the first region but exists in the second region. Therefore, the imaging apparatus confirms that the contrast exists in the first region and then starts the automatic focusing operation. Thus, when the subject having contrast in a region outside the first region is imaged, the first region is changed to the region in which contrast exists and the imaging apparatus detects a focused position using the above region as the focus detecting region.

Furthermore, according to the preferred embodiment of the present invention, the contrast detecting apparatus prohibits the automatic focusing operation of the imaging apparatus when the signal component corresponding to the region expanded by the expanding means and having a prescribed band for focusing operation of the imaging apparatus is extracted from the luminance signal obtained by imaging the subject and the existence of the contrast in a part corresponding to the expanded region of the subject is detected by the second detecting means in accordance with the extracted signal component and the extracted output of the second region component extracting means and the third detecting means determines that "no contrast exists" in a case where there is not existence. Therefore, in a case where the contrast detecting apparatus in accordance with the present invention is applied to the imaging apparatus, when the subject having no contrast in the expanded region is imaged, the automatic focusing operation is automatically inactivated. As a result, even if contrast exists in some parts of the imaging screen but the first region has no contrast, the apparatus does not immediately determine that "no contrast exists" in the subject and then the automatic focusing operation is prevented from being inactivated. Furthermore, when there is no contrast in the imaging screen, the automatic focusing operation of the imaging apparatus is prohibited by the detected output of the third detecting means.

Furthermore, according to another preferred embodiment of the present invention, the contrast detecting apparatus of the present invention is applied to the imaging apparatus having a structure capable of changing the imaging angle, in which a change of the imaging angle is detected and the first and second detecting means are inactivated. Therefore, in this case, while the imaging angle of the imaging apparatus is changing, the first and second detecting operation is inactivated, so that wrong contrast determination to the focus detecting region due to a change of the imaging screen caused by the change of the imaging angle is not made. Therefore, the imaging apparatus detects the focused position in accordance with a video signal obtained by imaging the subject using, for example the hill-climbing servo mechanism under a preferred condition, with the result that more accurate focusing operation can be implemented.

In addition, according to a further preferred embodiment, the contrast detecting apparatus is applied to the imaging apparatus comprising means for displaying whether the contrast of the subject exists or not to the outside. In this case, the user can notice that the subject has no contrast. Therefore, the subject capable of automatically being in focus is selected by the user.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(A)-5(I) are views showing a difference in output signal waveform between a first LPF and a second LPF in FIGS. 1 and 3 when contrast of a subject exists or not;

FIGS. 6(A)-6(D) are views showing a difference in output signal waveform between a first LPF, a second LPF and first comparator in FIGS. 1 and 3 when the contrast of the subject exists or not;

FIGS. 7(A)-7(D) are views showing a principle of contrast detection of the subject in a contrast detecting part 27 shown in FIGS. 1 and 3;

FIG. 10 is a schematic block diagram showing a conventional automatic focusing apparatus corresponding to FIG. 3.

DETAILED DESCRIPTION OF THE PREFERRED EMBODIMENTS

Figure 1:
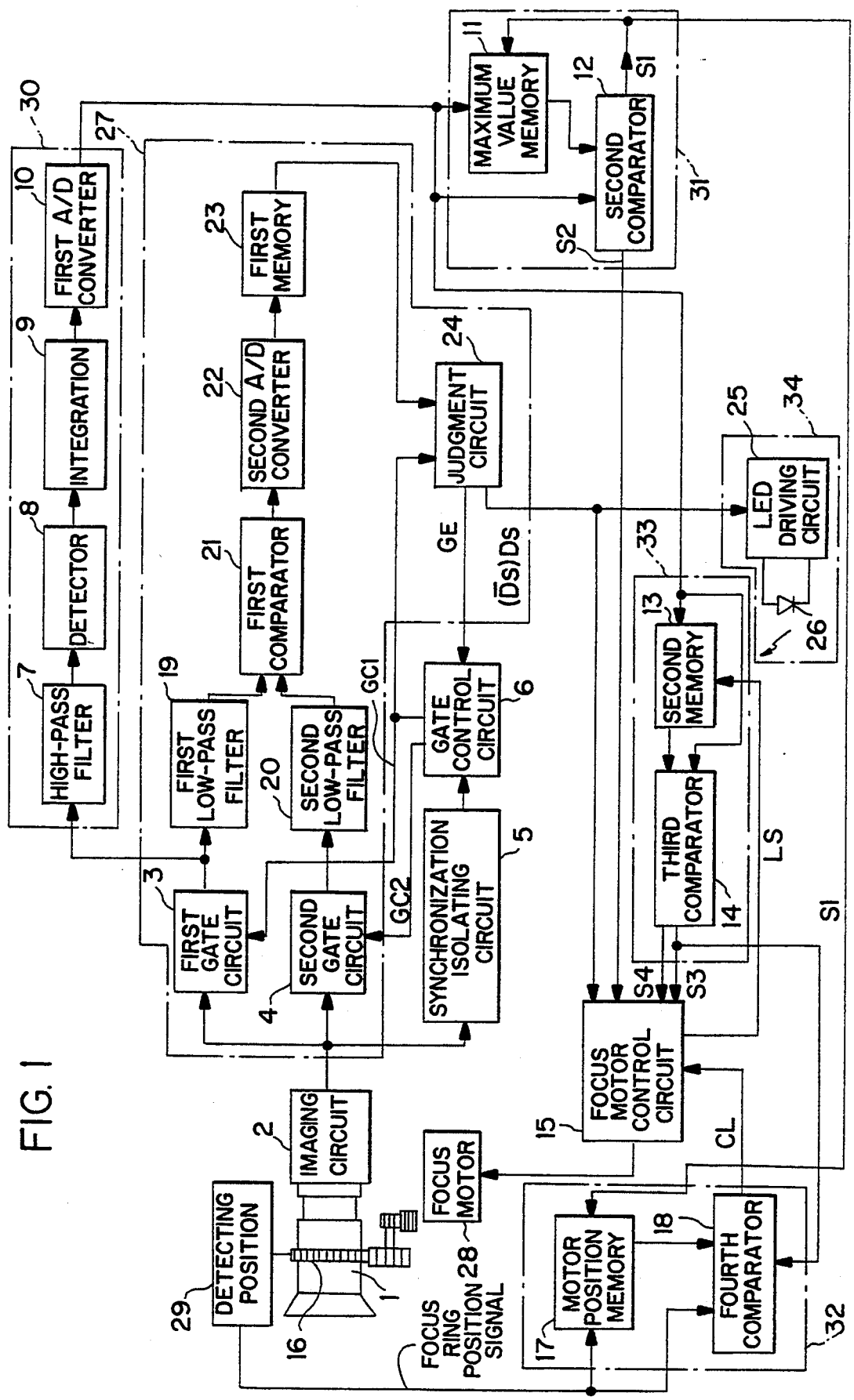
FIG. 1 is a schematic block diagram showing an automatic focusing apparatus in accordance with an embodiment of the present invention.

FIG. 1 is a schematic block diagram showing an automatic focusing apparatus in accordance with an embodiment of the present invention, which is used in a video camera. The automatic focusing apparatus in accordance with the present invention is different from a conventional one in that it comprises a contrast detecting part 27 which determines whether contrast of a subject exists or not and an alarm displaying part 34 which alarms a user whether the contrast of the subject exists or not.

Prior to a description of overall operation of the automatic focusing apparatus, a description will be given of a principle of how it is determined whether the contrast of the subject exists or not in reference to FIGS. 5 and 7.

FIG. 5 are views describing operation of the automatic focusing apparatus shown in FIG. 1 and also a difference in spectrum of a luminance signal due to the existence of the contrast of the subject. FIG. 7 are views describing a difference between a luminance signal of the subject capable of being in focus by a hill-climbing servo mechanism when the subject is in focus and that when it is out of focus.

FIG. 7(A) is a view showing an example of a subject capable of being in focus by the hill-climbing servo mechanism, FIGS. 7(B) and (C) are schematic views showing waveforms of luminance signals obtained from the subject shown in FIG. 7(A) when it is in focus and when it is out of focus, respectively and FIG. 7(D) is a view showing frequency characteristics of the luminance signals shown in FIGS. 7(B) and (C), for example when an imaging device has a size of ⅔ inch.

For example, when the subject has vertical stripes of black and white as shown in FIG. 7(A), the luminance signal obtained from that shows a rectangular waveform in which a high level part and a low level part which correspond to white and black of the subject, respectively are alternately arranged when it is in focus as shown in FIG. 7(B). In this case, the contrast of the subject is clearly displayed. In practice a higher harmonic component with fine amplitude is superimposed on the high level part and the low level part around its average level. Therefore, the luminance signal when the subject is in focus comprises signal components ranging from a relatively low frequency region corresponding to the rectangular wave indicating the contrast of the subject to a signal component in a considerable high frequency region corresponding to the higher harmonic component superimposed on the rectangular wave. However, since the amplitude of the higher harmonic component is considerably small as compared with the amplitude of the rectangular wave, response of the signal component in the high frequency region of the luminance signal of the subject having clear contrast is small.

Meanwhile, as shown in FIG. 7(C), in the luminance signal obtained from the subject when it is out of focus, the higher harmonic component superimposed on the level parts corresponding to white and black of the subject is decreased as compared with the luminance signal shown in FIG. 7(B) and a difference in level between the white part and the black part of the subject is also decreased, so that a sine wave having amplitude smaller than that of the rectangular wave is formed. Therefore, the luminance signal when it is out of focus comprises the signal component in a relatively low frequency region showing the contrast of the subject with amplitude smaller than that when it is in focus and it hardly comprises a signal component in a high frequency region corresponding to the higher harmonic component.

The difference in waveform of the luminance signals when it is in focus and when it is out of focus is represented by the difference of the frequency characteristics shown in FIG. 7(D). Referring to FIG. 7(D), the frequency characteristic of the luminance signal when the subject is in focus is represented by a curve a and that when it is out of focus is represented by a curve b. In FIG. 7, the abscissa shows a video signal frequency f (MHz) or a spatial frequency N (pair/mm) and the ordinate shows a response G (dB). These curves of frequency characteristics are found in accordance with the Bessel function $J_1$ with a minimum scattering circle $\delta$ (which is decreased when the subject is in focus and increased when it is out of focus) of reflected light from the subject and the video signal frequency f (or the spatial frequency N) as variables. More specifically, the relation between the spatial frequency N and the response G is represented as follows, that is, $G = J_1(\pi N\sigma)/\pi N\sigma$ using the Bessel function.

As can be seen from the curves a and b, the frequency characteristic of the luminance signal of the subject having strong contrast when it is in focus and that when it is out of focus are considerably different in a higher frequency region but almost the same in a low frequency region of 500 kHz or less. More specifically, the luminance signal of the subject having strong contrast obtained when it is in focus or out of focus comprises the signal component of 500 kHz or less. Therefore, in General, a frequency band extracted from the luminance signal to find a focal point evaluating value is set in a relatively higher frequency region of 200 kHz to 800 kHz or more. Thus, the focal point evaluating value obtained from the luminance signal when the subject is in focus shown in FIG. 7(B) is higher than that obtained from the luminance signal when it is out of focus shown in FIG. 7(C). As a result, it is possible to focus on the subject having strong contrast by a conventional automatic focusing apparatus using a hill-climbing servo mechanism.

Similar to the luminance signal corresponding to a black or white part of the image of FIG. 7(a) shown in FIGS. 7(B) and (C), the luminance signal obtained from the subject having small contrast or the subject having extremely fine patterns comprises a higher harmonic component with small amplitude superimposed around its average level. The frequency of the higher harmonic component is approximately several MHz.

As can be seen from the above, the luminance signal obtained from the subject with small contrast or the subject having extremely fine patterns, that is, the subject in which its luminance signal does not comprise the high frequency region component to be extracted in order to obtain the focal point evaluating value, comprises a component of a band of several MHz when the subject is in focus or when it is out of focus and does not comprise a component of a band of 500 kHz or less. Meanwhile, the luminance signal obtained from the subject having the strong contrast comprises the component of a band of 500 kHz or less when the subject is in focus or when it is out of focus. Thus, signal components whose band widths largely differ can be easily separated, for example the component of the band of 500 kHz and the component of the band of several MHz can be easily separated. Then, by using the difference in spectrum between the luminance signal of the subject incapable of being in focus and the luminance signal of the subject capable of being in focus, it is possible to determine whether the subject belongs to the former or latter.

According to this embodiment, in order to make this determination, a first LPF (low-pass filter) having a cutoff frequency of several MHz, that is, the first LPF which passes the component of the band of several MHz or less and a second LPF having a cut-off frequency of 100 kHz are used. Then, the luminance signals corresponding to regions having different areas in an imaging screen are input to the first and second LPF's.

FIG. 5(A) is a view showing an example of a subject having no contrast over the whole imaging screen and FIGS. 5(B) and (C) are views showing output signal waveforms of the first and second LPF's, respectively to which the luminance signal of the subject shown in FIG. 5(A) is input. Similarly, FIG. 5(D) is a view showing an example of a subject having clear contrast all over the imaging screen and FIGS. 5(E) and (F) are views showing output signal waveforms of the first and second LPF's, respectively to which the luminance signal of the subject shown in FIG. 5(D) is input. Also, FIG. 5(G) is a view showing an example of a subject comprising a region having no contrast and a region having clear contrast over the imaging screen and FIGS. 5(H) and (I) are views showing output signal waveforms of the first and second LPF's, respectively to which the luminance signal of the subject shown in FIG. 5(G) is input. Only FIGS. 5(A) to (F) are referred to in the following description. In addition, in the waveforms, the abscissa shows a horizontal scanning direction.

For example, when a uniformly white subject shown in FIG. 5(A) is imaged, the luminance signal corresponding to a small region E1 in this subject comprises a higher harmonic component with small amplitude of several MHz around its average luminance level. Therefore, the higher harmonic component appears almost as it is in an output signal waveform of the first LPF receiving such luminance signal as an input. More specifically, as shown in FIG. 5(B), in the output signal waveform of the first LPF the higher harmonic component with small amplitude is superimposed on a signal of an average luminance level of the subject shown in FIG. 5(A). On the other hand, the second LPF receiving the luminance signal obtained from a large region E2 in the subject shown in FIG. 5(A) removes the component of the band of several MHz comprised in the input luminance signal in accordance with a cut-off frequency. Therefore, as shown in FIG. 5(C), the output signal of the second LPF is a signal with a constant level which is equal to an average level V1 of the output signal with the first LPF. Therefore, when subtraction is made on the output signals of the first and second LPF's in the region E1, the signal obtained from this subtraction comprises only the higher harmonic component with small amplitude comprised in the output signal of the first LPF.

For example, when the subject having vertical stripes of black and white shown in FIG. 5(D) is imaged, in the waveform of the luminance signal obtained from the region E1 in the subject the higher harmonic component (several MHz) with small amplitude is superimposed on the average luminance level corresponding to black and white when it is in focus as described above. Therefore, the output signal waveform of the first LPF receiving such luminance signal is almost the same as the waveform of the input luminance signal (referring to FIG. 5(E)). On the other hand, since the cut-off frequency of the second LPF is several 100 kHz, the second LPF levels the input signal component of an order of several 100 kHz or more. In this case, the level of the luminance signal of the subject shown in FIG. 5(D) alternately repeats the white level and the black level with a frequency of several 100 kHz in accordance with a width of the vertical stripe. Therefore, the output signal waveform of the second LPF receiving the luminance signal obtained from the region E2 in the subject shown in FIG. 5(D) is a waveform in which the luminance level of the white part and the luminance level of the black level of the subject are leveled to some degree (referring to FIG. 5(F)). Thus, the level of the output signal of the second LPF reflects the vertical stripes of the subject and it is fluctuated around an average level V2 of the output signal of the first LPF, but which is small as compared with the that of the second LPF. Therefore, in the region E1, the signal level obtained by performing subtraction on the output signals of the first and second LPF's is higher than that when there is no contrast in the subject (referring to FIG. 5(A)).

As can be seen from the above, existence of the contrast of the subject can be detected by the level difference of the output signals of two LPF's having different cut-off frequencies. Therefore, according to this embodiment, it is determined that the present subject is capable of being in focus by the hill-climbing servo mechanism or not by determining whether the contrast of the subject exists or not in accordance with the above principle.

Next, operation of the automatic focusing apparatus shown in FIG. 1 will be described in detail hereinafter on the basis of operation of the contrast detecting part 27.

Figure 8:
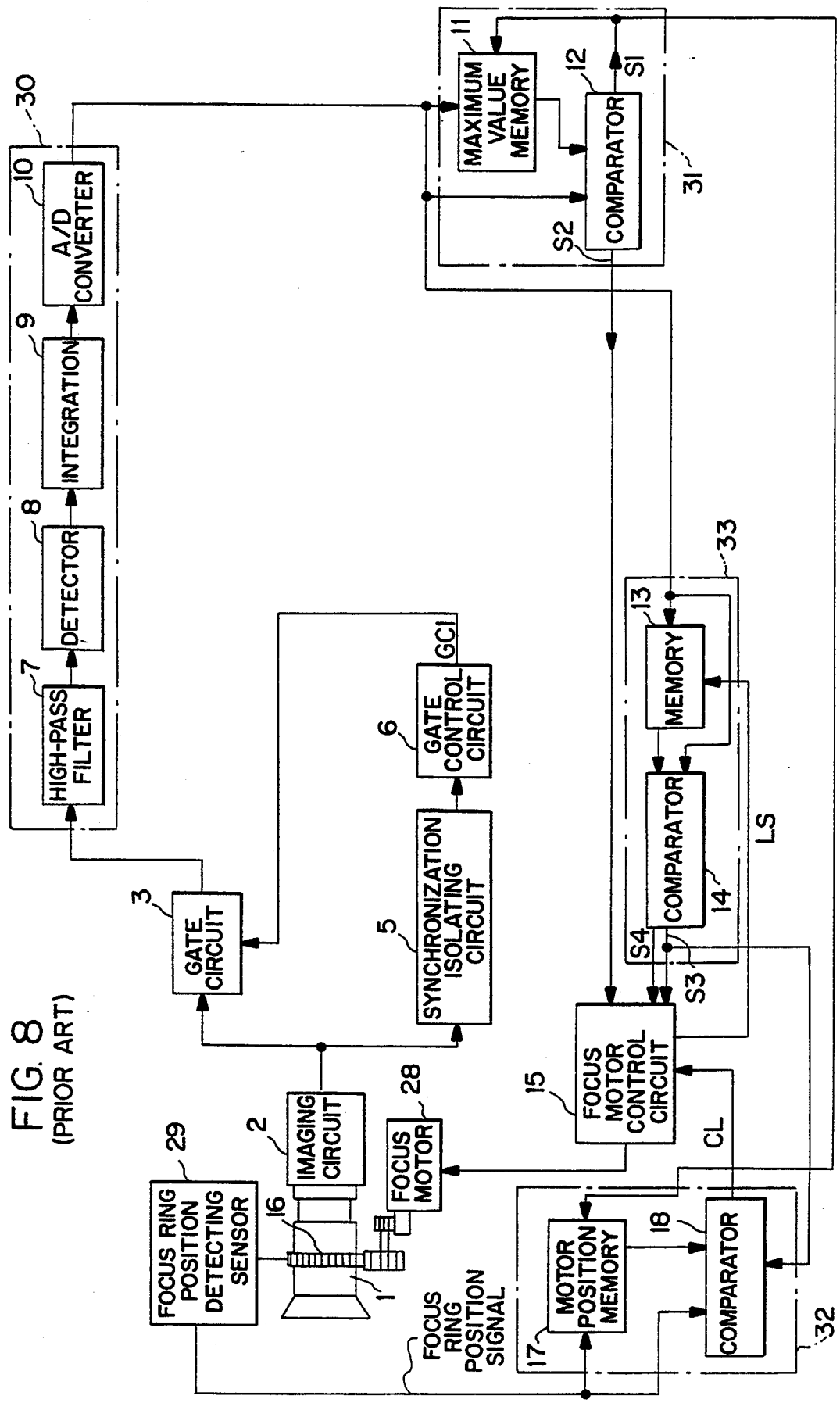
FIG. 8 is a schematic block diagram showing a conventional automatic focusing apparatus corresponding to FIG. 1.
Figure 9:
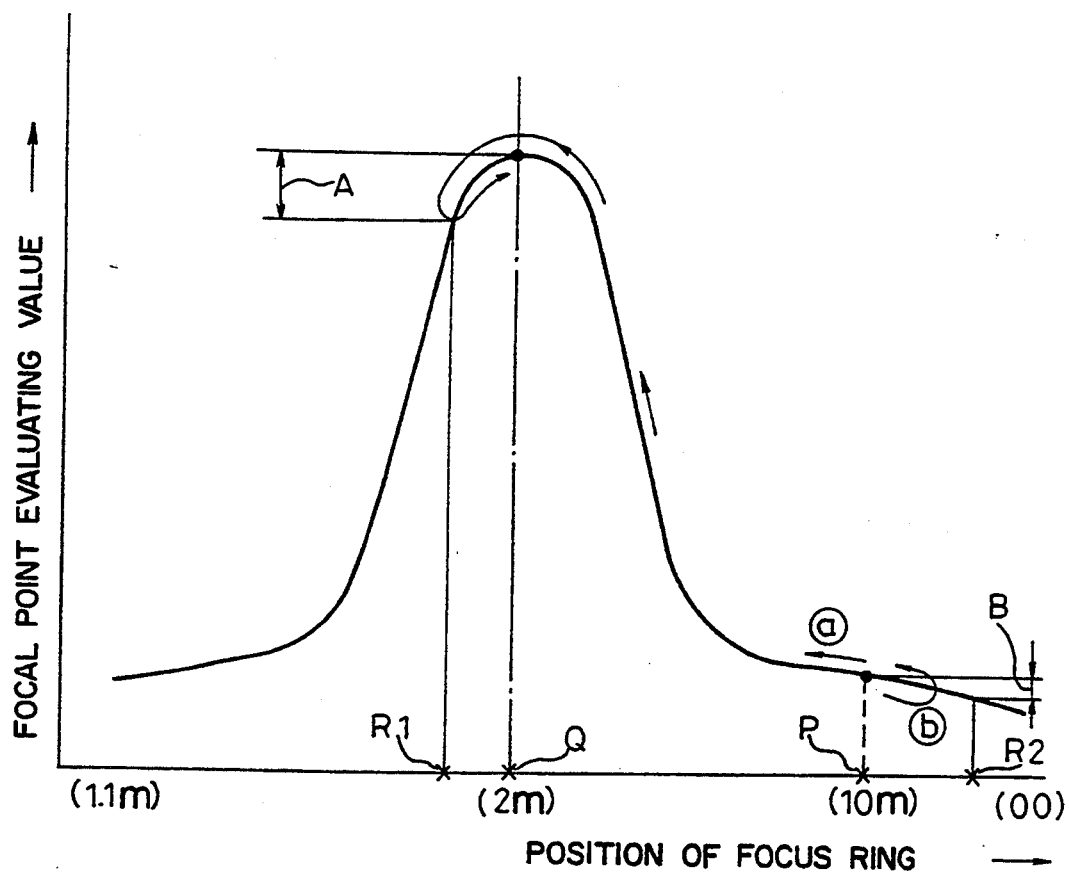
FIG. 9 is a graph showing the relation between a focal point evaluating value and a focus lens position.

Referring to FIG. 1, the automatic focusing apparatus comprises all function parts comprised in a conventional automatic focusing apparatus shown in FIG. 8, the contrast detecting part 27 and the alarm displaying part 34. In this automatic focusing apparatus, a focal point evaluating value forming part 30, a focal point evaluating value change detecting part 31, a focused position detecting part 32 and a subject change detecting part 33 perform the same operation as in the conventional one, which control a focus motor control circuit 15, whereby automatic focusing by the hill-climbing servo mechanism is implemented. A first gate circuit 3, a first A/D converter 10, a maximum value memory 11, a second comparator 12, a second memory 13, a third comparator 14 and a fourth comparator 18 in this automatic focusing apparatus correspond to the gate circuit 3, the A/D converter 10, the maximum value memory 11, the comparator the memory 13, the comparator 14 and the comparator 18 in the conventional automatic focusing apparatus as shown in FIG. 8, respectively, and operation of all of the function parts in the conventional automatic focusing apparatus is the same as described in BACKGROUND OF THE INVENTION.

However, in this automatic focusing apparatus, the luminance signal from an imaging circuit 2 is applied to not only the first gate circuit 3 which applies an input signal to the focal point evaluating value forming part 30 and a synchronous isolation circuit 5 but also a second gate circuit 4. The second gate circuit 4 is provided to set a region larger than a focus detecting region set by the first gate circuit 3 in an image screen as a sampling area for detecting the contrast in the contrast detecting part 27. Then, a gate control circuit 6 applies a gate switching signal GC 1 passing only the luminance signal obtained from the sampling area E1 to the first gate circuit 3 and a gate switching signal GC 2 passing only the luminance signal obtained from the sampling area E2 to the second gate circuit 4 so that the regions E1 and E2 in FIGS. 5(A) to (I) may be set as a sampling area for detecting the focused position and a sampling area for detecting the contrast, respectively, in accordance with a vertical synchronous signal, a horizontal synchronous signal and a fixed oscillator output. Thus, the luminance signal corresponding to the sampling area E1 is only applied to the first LPF 19 and the focal point evaluating value forming part 30 through the first gate circuit 3 and the luminance signal corresponding to the sampling area E2 is only applied to the second LPF 20 through the second gate circuit 4.

Next, operation of the contrast detecting part 27 and the alarm displaying part 34 will be described in detail hereinafter.

The contrast detecting part 27 comprises the first gate circuit 3, the second gate circuit 4, a first LPF 19 passing a component of a band of several MHz or less from the luminance signal of the small sampling area E1 extracted by the first gate circuit 3, a second LPF 20 passing a component of a band of several 100 kHz or less which is lower than that of the first LPF 19 from the luminance signal of the large sampling area E2 extracted by the second gate circuit 4, a first comparator 21 comparing the output signal level of the first LPF 19 with that of the second LPF 20, a second A/D converter 22 converting the output of the first comparator 21 to digital data and a first memory 23 storing the digital data converted by the second A/D converter 22.

The contrast detecting part 27 further comprises a judgment circuit 24 which determines whether the contrast of the present subject exists or not in accordance with contents of the first memory 23 and the gate control signal GC1 from the gate control circuit 6 and then controls the gate control circuit 6, the focus motor control circuit 15 and the alarm displaying part 34 in accordance with the result of above determination.

Figure 2:
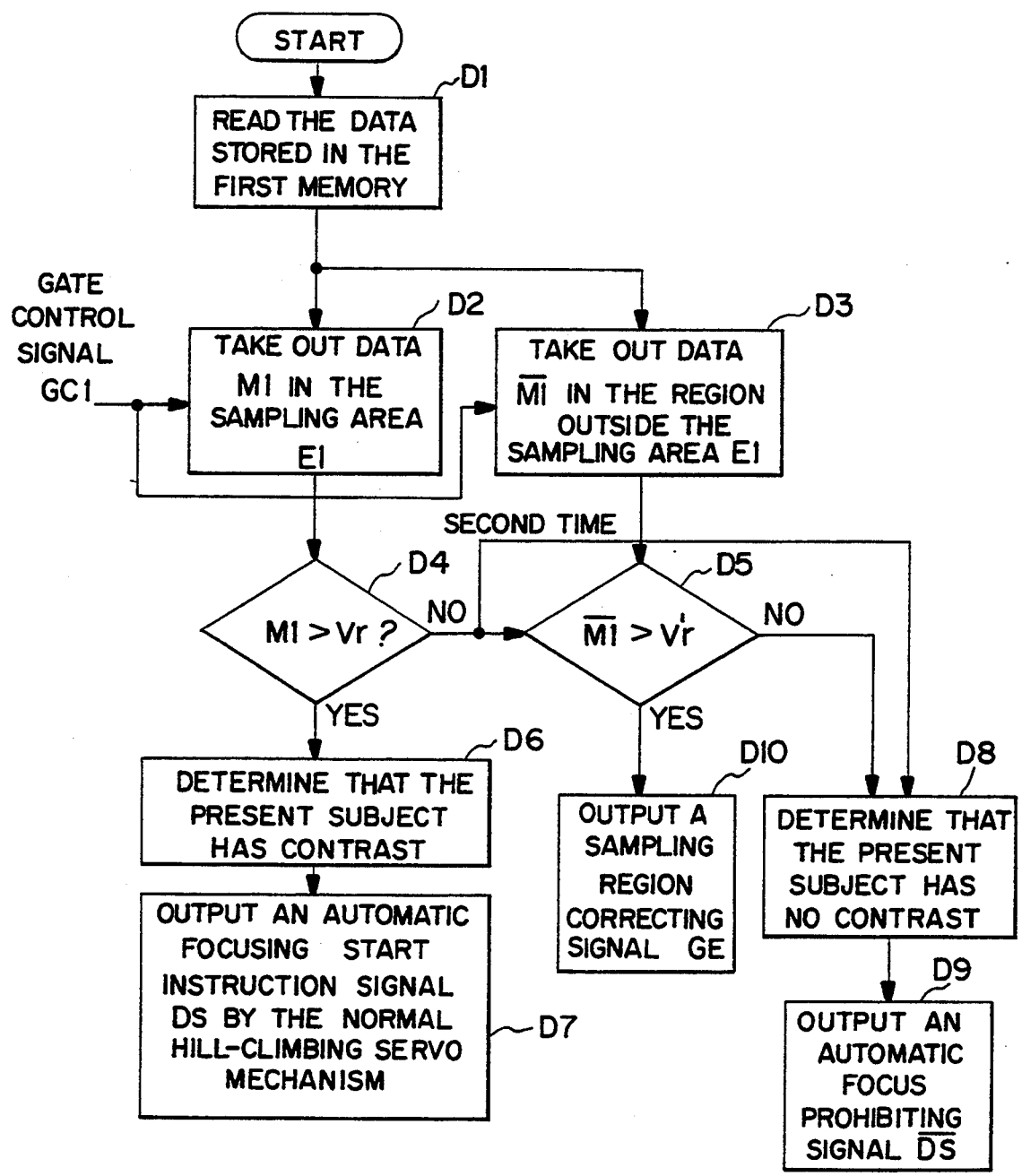
FIG. 2 is a flow chart showing operation of a determining circuit in FIG. 1.

Operation of the contrast detecting part 27 will be described hereinafter in reference to FIGS. 2, 5, 6 and 7. FIG. 2 is a flow chart of operation of the judgment circuit 24. FIGS. 6(A) and (B) show output signal waveforms of the first LPF 19, the second LPF 2 and the first comparator 21 when the subject having no contrast is imaged. FIGS. 6(C) and (D) show output signal waveforms of the first LPF 19, the second LPF 20 and the first comparator 21 when the subject having contrast is imaged under the unfocused state.

For example, when the uniformly white subject shown in FIG. 5(A) is imaged, the luminance signals input to the first LPF 19 and the second LPF 20 comprise a higher harmonic component with small amplitude around the average luminance level of the subject, whether it is in focus or not. Therefore, as described above, the first LPF 19 having a high cut-off frequency outputs a signal with a waveform shown by FIG. 5(B) and a solid line in FIG. 6(A). On the other hand, the second LPF 20 having a low cut-off frequency cuts the above higher harmonic component and outputs a signal with a constant level which is equal to the average luminance level, shown by FIG. 5(C) and a broken line in FIG. 6(A).

Meanwhile, for example when the subject with stripes of black and white shown in FIG. 5(D) is imaged, the luminance signals input to the first LPF 19 and the second LPF 20 when the subject is in focus show waveform shown in FIG. 7(B). More specifically, the luminance signal in this case comprises a fundamental wave component having a frequency corresponding to a luminance change (contrast) of the subject in which the difference between the average luminance level of the white part and that of the black part is its amplitude and a higher harmonic component with small amplitude around the average luminance levels of the white part and the black part. At this time, the first LPF 19 passes both the fundamental wave component and the higher harmonic component and outputs a signal having a waveform shown in FIG. 5(E). On the other hand, the second LPF 20 cuts the higher harmonic component, passes the fundamental wave component and outputs a signal having a waveform shown in FIG. 5(F).

Meanwhile, the luminance signals input to the first LPF 19 and the second LPF 20 when the subject is out of focus comprises the fundamental wave component but does not comprise the higher harmonic component comprised in the luminance signal when it is in focus, so that they show a waveform shown in FIG. 7(C). However, the amplitude of the fundamental wave component in this case is smaller than that when the subject is in focus. Therefore, the first LPF 19 passes this fundamental wave component and outputs a signal having a waveform shown by a solid line in FIG. 6(C). The second LPF 20 outputs a signal formed by leveling the fundamental wave component (shown by a broken line in FIG. 6(D)).

As can be clear in the above example, when the subject having small contrast all over is imaged, the output signal of the first LPF 19 comprises a higher harmonic component having small level fluctuation shown by a solid line in FIG. 6(A) and the higher harmonic component of the output signal of the first LPF 19 is leveled as shown by a broken line in FIG. 6(A) in the output signal waveform of the second LPF 20. Therefore, a difference in level between the output signals of the first LPF 19 and the second LPF 20 is small in any part in the sampling area E1.

Meanwhile, when the subject having strong contrast all over is imaged, since the fundamental wave component of the luminance signal representing the contrast of the subject appears in the output signal of the first LPF 19, the output signal of the first LPF 19 has large level fluctuation. On the other hand, the output signal of the second LPF 20 shows the average luminance level of the subject in the sampling area E2. Therefore, the level difference between the output signals of the first LPF 19 and the second LPF 20 is increased in a luminance change part in the sampling area E2.

The output signals of the first LPF 19 and the second LPF 20 are input to the first comparator 21. The first comparator 21 performs subtraction between the output signals of the first LPF 19 and the second LPF 20 and outputs a voltage whose level is in proportion to the level difference of these signals. Therefore, when the subject having small contrast is imaged, the output signal of the first comparator 21 is small as shown in FIG. 6(B) because it reflects the small amplitude of the higher harmonic component comprised in the output of the first LPF 19. On the other hand, when the subject having large contrast is imaged, the output signal of the first comparator 21 is large as shown in FIG. 6(D) because it reflects the amplitude of the fundamental wave component, which represents the contrast of the subject and comprised in the output of the first LPF 19.

The output signal level of the first comparator 21 is converted to a digital signal by the second A/D converter 22 and then once stored in the first memory 23.

Thus, data indicating whether the contrast of the subject exists in the sampling area E1 and in the region outside thereof (a region included in the sampling area E2 but not included in the sampling area E1) or not is stored in the first memory 23.

Operation of the judgment circuit 24 will be described hereinafter in reference to FIG. 2. The judgment circuit 24 reads the data stored in the first memory 23 (operation step D1). Then, the judgment circuit 24 determines whether that data, that is, the output signal levels of the first comparator 21 in the sampling area E1 and its outside region exceed a predetermined judgment reference level $V_r$ or not. This operation of the judgment circuit 24 will be described in detail hereinafter.

The judgment circuit 24 takes out the output signal level of the first comparator 21 either in the sampling area E1 or its outside region of the read data in accordance with the gate control signal GC1 from the gate control circuit 6.

The gate control signal GC1 is a signal for setting the sampling area E1. Therefore, the data which is stored in the first memory while the gate control signal GC1 which turns the first gate circuit 3 ON is output from the gate control circuit 6, is at the output signal level of the first comparator 21 in the sampling area E1. On the contrary, the data which is stored in the first memory while the gate control signal GC1 which turns the first gate circuit 3 OFF is output from the gate control circuit 6, is at the output signal level of the first comparator 21 in the region outside the sampling area E1.

Then, when the gate control signal GC1 turns the first gate circuit 3 ON, the judgment circuit 24 takes out data M1 in the sampling area E1 from the read data (operation step D2). Then, the judgment circuit 24 determines whether the output signal level of the first comparator 21 in the sampling area E1 is larger than the predetermined judgment reference level $V_r$ or not (operation step D4). When this result is "YES", the judgment circuit 24 determines that the present subject has contrast (operation step D6) and then applies an automatic focusing start instruction signal $D_s$ which activates the above function of automatic focusing operation to the focus motor control circuit 15.

The focus motor control circuit 15 starts the above series of operation for automatic focusing operation in response to the start instruction signal $D_s$. Therefore, the subject with contrast can be in focus by the normal hill-climbing servo mechanism.

Meanwhile, in a case where the result at the operation step D4 in FIG. 2 is "NO", the judgment circuit 24 takes out data $\overline{M1}$ in the region outside the sampling area E1 from the data read at the operation step D1 when the gate control signal GC1 turns the first gate circuit 3 OFF (operation step D3). Then, the judgment circuit 24 determines whether that taken out data, that is, the output signal level of the first comparator 21 in the region outside the sampling area E1 is larger than the predetermined judgment reference level $V_r'$ or not (operation step D5). When the result is "NO", that is, when the results of determination of the data M1 in the sampling area E1 and the data $\overline{M1}$ in the region outside the sampling area E1 are the same, the judgment circuit 24 determines that the present subject has no contrast (operation step D8) and outputs an automatic focus prohibiting signal $\overline{D_s}$ to the focus motor control circuit 15 and the alarm displaying part 34 (operation step D9).

In this case, the judgment reference level $V_r$ is set so as to be larger than the output signal level of the first comparator 21 when the subject having small contrast is imaged but smaller than that when the subject having strong contrast is imaged as shown in FIG. 6(B).

Similarly, the judgment reference level $V_r'$ can be set at such a value which can determine whether the contrast of the subject exists in the region outside the sampling area E1 or not by comparison with the output signal level of the first comparator 21 in the region outside the sampling area E1. However, since the first gate circuit 3 is OFF and the second gate circuit 4 is ON in the region outside the sampling area E1, the output signal can not be obtained from the first LPF 19. Therefore, the output signal of the first comparator 21 is the output signal of the second LPF 20, that is, the signal which indicates a change of the average luminance level in the large sampling area E2. Therefore, in this case, the Judgment reference level $V_r'$ other than the predetermined judgment reference level $V_r$ has to be a reference value for determining whether the contrast of the subject exists in the region outside the sampling area E1 or not. In this case, the reference level $V_r'$ is set so that it is determined that contrast exists when the output signal level of the first comparator 21 in the region outside the sampling area E1 exceeds the reference level $V_r'$ and that the contrast does not exist when it is equal to the reference level $V_r'$ or less. Therefore, the judgment circuit 24 outputs the automatic focus prohibiting signal $\overline{D_s}$ when the contrast of the subject is small in the sampling area E1 and its outside region, that is, when the imaged subject has no contrast over a large range of the imaging screen.

The focus motor control circuit 15 inactivates the focus motor 28 in response to the automatic focus prohibiting signal $D_s$ from the judgment circuit 24.

The alarm displaying part 34 comprises an LED (light emitting diode) 26 and an LED driving circuit 25. The LED driving circuit 25 drives the LED 26 in response to the automatic focus prohibiting signal $\overline{D_s}$. Therefore, when the imaged subject has not contrast over a large range of the imaging screen, that is, when it is not possible to focus on the subject by the hill-climbing servo mechanism, the focus lens is not driven and then the LED 26 emits light. The LED 26 is attached on the outside of the apparatus and notifies the user that the subject incapable of being in focus is imaged.

Thus, according to this embodiment of the present invention, when the subject incapable of being in focus in view of its principle is selected as the subject to be imaged, the focus lens is not automatically driven and also alarm is displayed. Then, when the user notices the alarm display and knows the subject is not appropriate, he can immediately change the subject. Therefore, when the subject incapable of being in focus is imaged, the focus lens is not wastefully driven and then the image is not out of focus for a long time as in the prior art.

In addition, according to this embodiment of the present invention, when the result of the judgment circuit 24 in the sampling area E1 is different from that in the region outside the sampling area E1, that is, when the result at the operation step D5 is "YES", the judgment circuit 24 outputs a sampling region correcting signal $G_E$ to the gate control circuit 6 (operation step D10). The gate control circuit 6 corrects the gate control signal GC1 to be applied to the first gate circuit 3 so as to expand the sampling area E1 by a predetermined area which is set by the first gate circuit 3 and change the focus detecting region E1 for automatic focusing to, for example a region E3 shown in FIG. 5(G) in response to the correcting signal $G_E$. Thereafter, the judgment circuit 24 performs a series of operation of the operation steps D1 to D9 again. As a result, a signal which indicates either prohibition or start of the automatic focusing operation is applied to the focus motor control circuit 15.

More specifically, when the second result at the operation step D4 is "YES", the judgment circuit 24 determines that the contrast exists and then outputs the signal $G_S$ which indicates a start of the automatic focusing operation. The fact that the second result at the operation step D4 is "YES" means that the present subject has no contrast in the sampling area E1 but has contrast in the sampling area E3. Therefore, in this case, focusing operation is performed in accordance with a focal point evaluating value in the focus detecting region E3 having contrast. Therefore, even if the target subject having contrast exists a little outside the sampling area E1, the subject is surely in focus.

The subject determined by the judgment circuit 24 as described above is shown in FIG. 5(G). The subject shown in FIG. 5(G) is white and has no contrast in the central part but has stripes of black and white in the outside part. Therefore, if this subject is imaged when it is in focus, the output signal of the first LPF 19 in the sampling area E1 shows the same waveform as that when the subject has no contrast all over is imaged (referring to FIG. 5(B)) as shown in FIG. 5(H). However, the output signal of the second LPF 20 in the sampling area E2 is at a constant level showing the average luminance of the sampling area E1 in a part corresponding to the sampling area E1 and has the fundamental wave component of the black and white stripes, which is a contrast component of the subject in a part corresponding to the region outside the sampling area E1 as shown in FIG. 5(I). Of course, when the subject is out of focus, although this fundamental wave component is lower than that when it is in focus, it is also sufficiently left. Therefore, it is possible to determine whether the contrast exists at that part or not from the output signal level of the second LPF 20 in the region outside the sampling area E1. On the contrary, when the second result at the operation step D4 is "NO", the judgment circuit 24 outputs the signal $G_S$ which indicates prohibition of the automatic focusing operation. The fact that the second result at the operation step D4 is "NO" means that the subject in the increased focus detecting region has also no contrast. Therefore, in this case, the lens is prohibited from being driven so that the lens is not wastefully driven.

Figure 3:
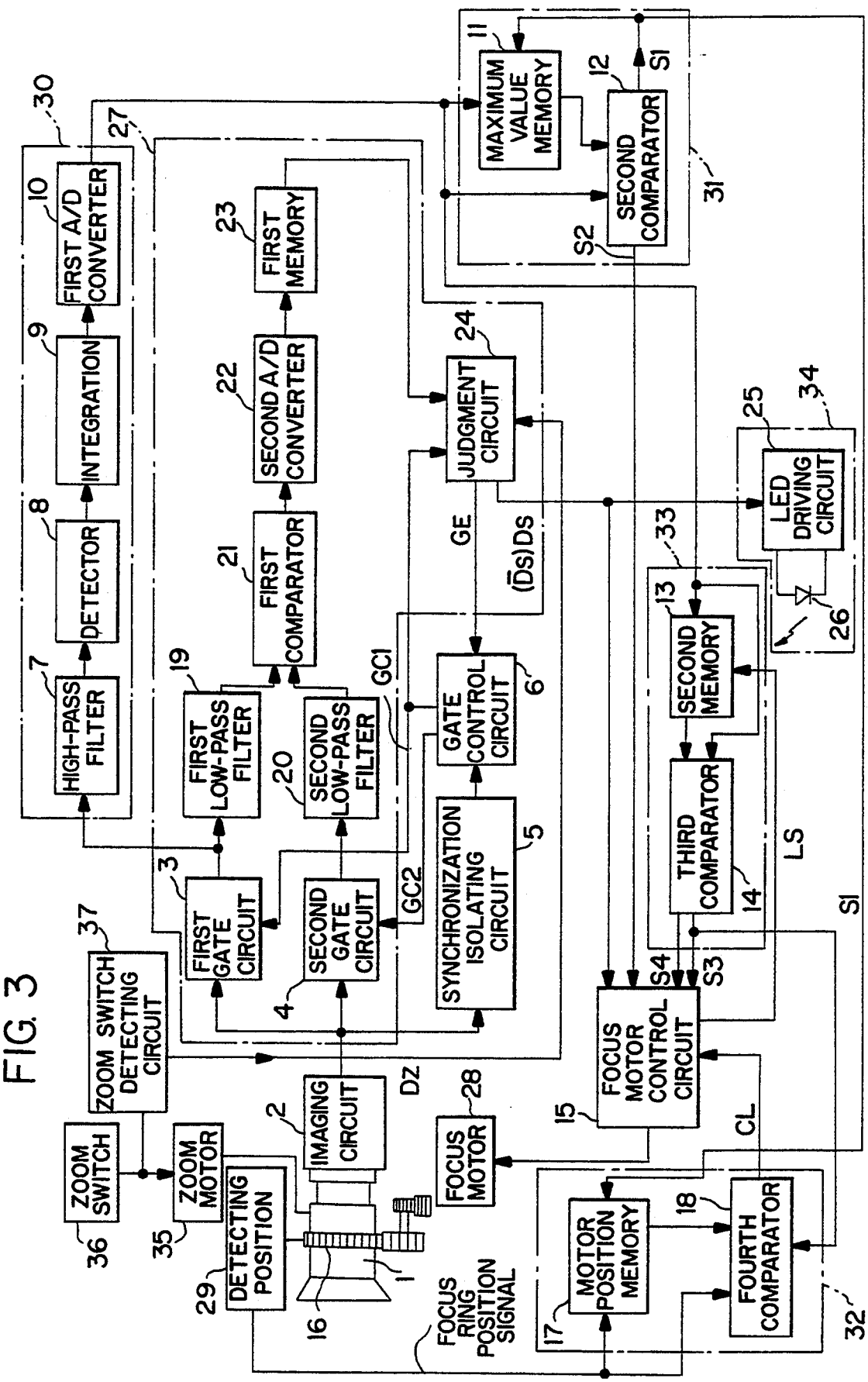
FIG. 3 is a schematic block diagram showing an automatic focusing apparatus in accordance with another embodiment of the present invention.

FIG. 3 is a view showing an automatic focusing apparatus in accordance with another embodiment of the present invention, which comprises all function parts comprised in the conventional automatic focusing apparatus shown in FIG. 10, a contrast detecting part 27, an alarm displaying part 34 and a zoom switch detecting circuit 37. According to this embodiment, the zoom switch detecting circuit 37 detects that a zoom switch 36 is pushed, that is, detects that an imaging angle almost starts to change and then outputs a determination prohibiting signal $D_Z$ for prohibiting a series of contrast determination operation to be described later to the judgment circuit 24.

Figure 4:
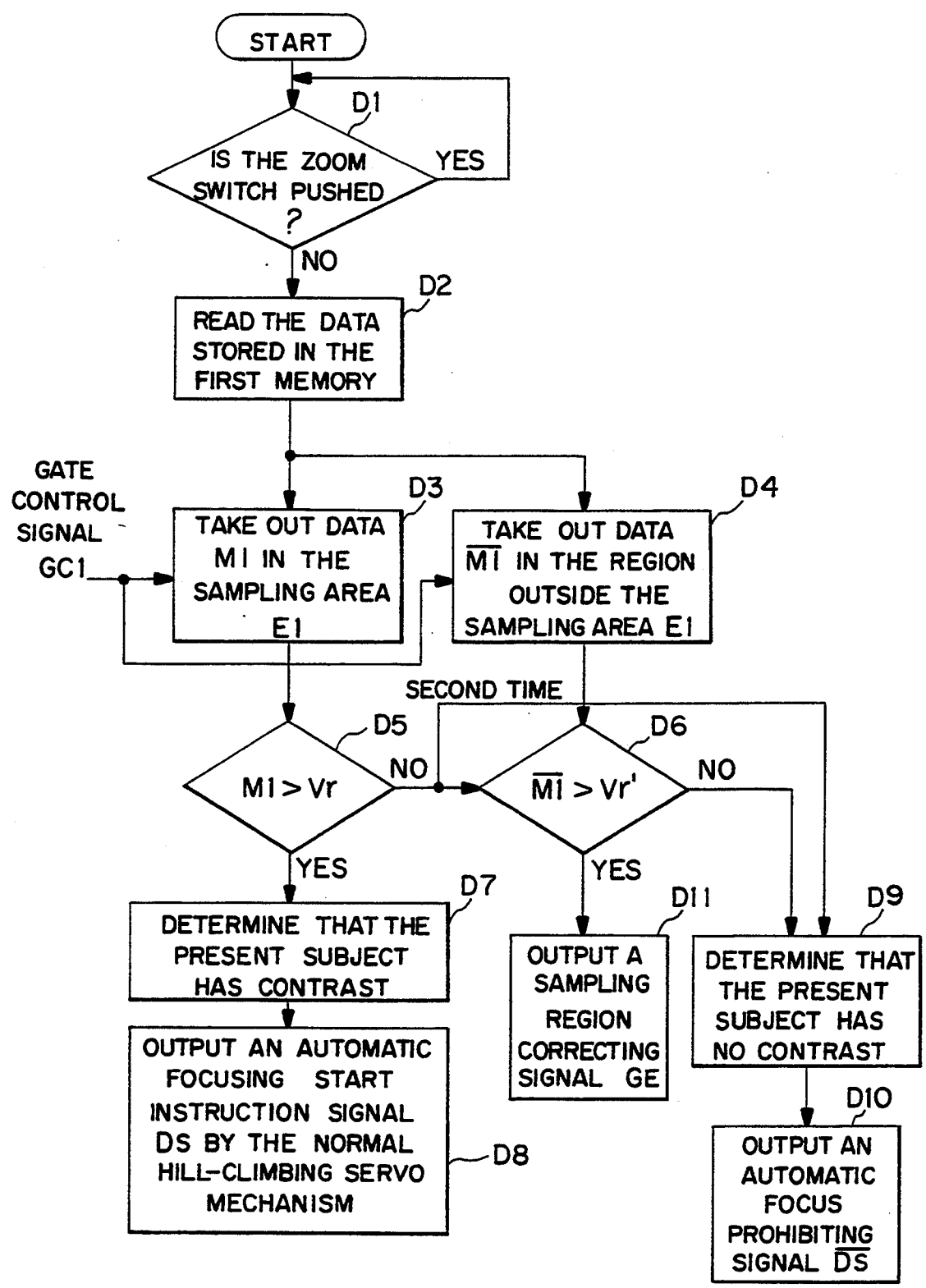
FIG. 4 is a flow chart showing operation of a determining circuit in FIG. 3.

Next, operation of the judgment circuit 24 will be described in reference to FIG. 4. The judgment circuit 24 determines whether the zoom switch 36 is pushed or not from a fact whether the determination prohibiting signal $D_Z$ is output from the zoom detecting circuit 37 or not (operation step D1). When the determination prohibiting signal $D_Z$ is not output from the zoom switch detecting circuit 37, the judgment circuit 24 determines that the imaging angle is fixed and then reads data stored in the first memory 23 first (operation step D2). Then, the judgment circuit 24 determines whether the data, that is, the output signal levels of the first comparator 21 in the sampling area E1 and in the region outside the sampling area E1 exceed the predetermined Judgment reference level $V_r$ or not. Since operation steps D2 to D11 of the judgment circuit 24 hereinafter are the same as the above operation steps D1 to D11, description thereof will be omitted.

While the zoom switch detecting circuit 37 is pushed, the imaging angle is changing every moment, so that the image taken by the imaging circuit 2 is on the expansion or reduction. Therefore, since the states of the contrast in the sampling area E1 and the sampling area E2 of the focus detecting regions are also changing for that period, it is not appropriate to exactly determine whether the contrast of the subject exists or not at that time. Then, when the determination prohibiting signal $D_Z$ is output from the zoom switch detecting circuit 37, the judgment circuit 24 determines that the imaging angle almost starts to change at the operation step D1 and then will not perform contrast determination operation after the operation step D2 and determines whether the zoom switch 36 is continuously pushed or not. Therefore, according to this embodiment, the contrast determination is not made until the determination prohibiting signal $D_Z$ stops to be output from the zoom switch detecting circuit 37, that is, until the imaging angle is fixed, so that automatic focusing operation is not also performed until then. Then, when the imaging angle is fixed, the contrast determination operation of the judgment circuit 24 automatically starts.

Thus, according to this embodiment of the present invention, only when the imaging angle is fixed, the contrast determination is made, so that correct contrast determination can be made to the subject.

According to the above embodiment of the present invention, although the focus detecting region is expanded only once, the focus detecting region can be expanded several times in accordance with necessity and then finally it can be determined whether the contrast of the subject exists or not.

In addition, the above operation of the contrast detecting part 27 can be performed in a software manner using a microcomputer or the like.

In addition, although the center of the sampling area is set at the center of the range of image in the above embodiment, it is needless to say that the same effect can be obtained even if the center of the sampling area is not set at the center thereof.

Although the LED is used as alarming means for notifying the user that the subject having no contrast is imaged in the above embodiments, the user can be alarmed by characters or signs in a view finder attached to a video camera or the like or by sound.

Although an alarm to the user and prohibition of the drive of the lens are generated at the same time when the subject having no contrast is imaged in this embodiment of the present invention, only either one of them can be generated when the subject having no contrast is imaged.

In addition, although the present invention is used for controlling operation of the automatic focusing apparatus of the video camera in accordance with the above embodiment, the contrast detecting apparatus of the present invention can be used in another field such as an apparatus for detecting movement of the subject in the imaging screen.

As described above, according to the present invention, it is exactly and automatically determined whether the contrast of the subject exists or not in accordance with a luminance signal obtained from the subject. Therefore, when the contrast detecting apparatus in accordance with the present invention is applied to the automatic focusing apparatus, it is possible to control the drive of the lens or information supplying means to users in accordance with fact whether the contrast of the subject exists or not. As a result, when the subject having no contrast is imaged, the lens is not unnecessarily driven so that function and operability of the automatic focusing apparatus can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contrast detecting apparatus for controlling an automatic focusing operation of an imaging apparatus in which a first region of an image is focused by changing a state of an optical system in accordance with a luminance signal obtained from the first region, the image being obtained by imaging a subject on an imaging screen, the contrast detecting apparatus comprising:

first setting means for setting the first region of the imaging screen;

second setting means for setting a second region of the imaging screen;

first region component extracting means for extracting a first signal component of the luminance signal corresponding to the first region set by said first setting means, the first signal component having a prescribed frequency band;

second region component extracting means for extracting a second signal component of the luminance signal corresponding to the second region set by said second setting means, the second signal component having a second frequency band lower than the prescribed frequency band;

first detecting means for detecting whether the subject has contrast in a part corresponding to the first region in accordance with the first and second signal components; and means for activating the automatic focusing operation in response to a contrast signal output from said first detecting means indicating that contrast exists.

2. The contrast detecting apparatus in accordance with claim 1, further comprising:

second detecting means for detecting whether contrast of the subject exists in the second region, which is set larger than the first region, in response to an output from said first detecting means indicative that contrast does not exist in the first region;

expanding means for expanding the first region by a predetermined area in response to an output from said second detecting means indicative that contrast does not exist in the second region;

expanded region component extracting means for extracting a third signal component of the luminance signal corresponding to the region expanded by said expanding means, the third signal component having the prescribed frequency band;

third detecting means for detecting whether contrast of the subject exists in a part corresponding to the expanded region in accordance with the third signal component and the second signal component; and means for deactivating the automatic focusing operation in response to an output from said third detecting means indicative that contrast does not exist in the expanded region.

3. The contrast detecting apparatus in accordance with claim 1, wherein the imaging apparatus comprises image angle changing means, the contrast detecting apparatus further comprising:

imaging angle change detecting means for detecting that the imaging angle is changing; and means for deactivating operation of said first detecting means in response to an signal output from said imaging angle change detecting means.

4. The contrast detecting apparatus in accordance with claim 1, wherein the imaging apparatus further comprises means for displaying the existence of contrast of the subject in accordance with the contrast signal output of said first detecting means.

5. The contrast detecting apparatus according to claim 1, said first detecting means detecting a level difference between the first and second signal components, comparing the level difference to a predetermined reference level, and determining contrast exists when the level difference exceeds the predetermined reference level.

6. The contrast detecting apparatus according to claim 1, wherein the second region comprises an area covering all of the imaging screen and the first region comprises a smaller area within the second region.

7. The contrast detecting apparatus in accordance with claim 1, wherein said first and second region component extracting means respectively comprise first and second low pass filters, said second low pass filter having a cut-off frequency lower than a cut-off frequency of said first low pass filter.

8. The contrast detecting apparatus in accordance with claim 7, wherein the cut-off frequency of said first low pass filter is several MHz and the cut-off frequency of said second low pass filter is several 100 KHz.

9. A method of detecting contrast to control an automatic focusing operation of an imaging apparatus in which a first region of an image is focused by changing a state of an optical system in accordance with a luminance signal obtained from the first region, the image being obtained by imaging a subject on an imaging screen, the method of detecting contrast comprising the steps of:

setting the first region of the imaging screen;

setting a second region of the imaging screen;

extracting a first signal component of the luminance signal corresponding to the first region, the first signal component having a prescribed frequency band;

extracting a second signal component of the luminance signal corresponding to the second region, the second signal component having a second frequency band lower than the prescribed frequency band;

detecting whether the subject has contrast in a part corresponding to the first region in accordance with the first and second signal components; and activating the automatic focusing operation in response to said step of detecting when the subject has contrast.

10. The method of detecting contrast according to claim 9, wherein said step of detecting comprises the steps of detecting a level difference between the first and second signal components;

comparing the level difference to a predetermined reference level; and determining contrast exists when the level difference exceeds the predetermined reference level.

11. The method of detecting contrast according to claim 9, wherein the second region comprises an area covering all of the imaging screen and the first region comprises a smaller area within the second region.

12. The method of detecting contrast according to claim 11, wherein said step of extracting the first signal component comprises passing the luminance signal corresponding to the first region through a first low pass filter with a cut-off frequency of several MHz and said step of extracting the second signal component comprises passing the luminance signal corresponding to the second region through a second low pass filter with a cut-off frequency of several 100 KHz.

13. An auto-focus apparatus comprising:
in-focus state detecting means for detecting an in-focus state of an optical system during imaging of an object on the basis of a luminance signal from a first region of the imaged object;
judgment means for determining existence of contrast in the first region of the imaged object;
focusing means for changing a state of said optical system on the basis of an output of said in-focus state detecting means;
first detecting means for determining existence of contrast in a second region of the imaged object in response to receipt of a judgment output from said judgment means indicative of nonexistence of contrast in the first region; and
disabling means for disabling said focusing means on the basis of a judgment output from said first detecting means indicative of non-existence of contrast in the second region.

* * * * *